United States Patent
Coburn, IV

(10) Patent No.: US 9,916,125 B2
(45) Date of Patent: Mar. 13, 2018

(54) DEVICE GROUP IDENTIFICATION

(71) Applicant: Sonos, Inc., Santa Barbara, CA (US)

(72) Inventor: Arthur L. Coburn, IV, Lexington, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 15/099,748

(22) Filed: Apr. 15, 2016

(65) Prior Publication Data
US 2016/0342378 A1 Nov. 24, 2016

Related U.S. Application Data

(63) Continuation of application No. 14/308,571, filed on Jun. 18, 2014, now Pat. No. 9,348,824.

(51) Int. Cl.
*G06F 17/00* (2006.01)
*G06F 3/16* (2006.01)
(Continued)

(52) U.S. Cl.
CPC .............. *G06F 3/162* (2013.01); *G06F 3/165* (2013.01); *G06F 17/30053* (2013.01);
(Continued)

(58) Field of Classification Search
CPC ........ G06F 17/30053; H04M 1/72533; H04M 1/72558; H04N 21/4126; H04N 21/41407; H04N 21/4825; H04N 21/8113
See application file for complete search history.

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

| EP | 1389853 A1 | 2/2004 |
|---|---|---|
| WO | 200153994 | 7/2001 |
| WO | 2003093950 A2 | 11/2003 |
| WO | 2008048836 | 4/2008 |

OTHER PUBLICATIONS

International Bureau, International Preliminary Report on Patentability dated Dec. 29, 2016, issued in connection with International Application No. PCT/US2015/036456, filed on Jun. 18, 2015, 10 pages.
"Denon 2003-2004 Product Catalog," Denon, 2003-2004, 44 pages.
United States Patent and Trademark Office, U.S. Appl. No. 60/490,768, filed Jul. 28, 2003, entitled "Method for synchronizing audio playback between multiple networked devices," 13 pages.
(Continued)

*Primary Examiner* — Andrew C Flanders
(74) *Attorney, Agent, or Firm* — McDonnell Boehnen Hulbert & Berghoff LLP

(57) ABSTRACT

Method and systems are provided for identification of device groups in a network. In an example implementation, a first playback device receives, from a second playback device, first data indicating a first group identification corresponding to a zone group, the zone group including the first playback device and the second playback device, and the second playback device operating as a group coordinator of the zone group. After receiving the first data, the first playback device receives a message indicating that the second playback device is leaving the zone group. In response to receiving the message, the first playback device determines a second group identification corresponding to the zone group and after determining the second group identification, transmits, over to at least one controller device configured to control at least the first playback device and the second playback device, second data indicating the second group identification.

20 Claims, 5 Drawing Sheets

(51) Int. Cl.
*G06F 17/30* (2006.01)
*H04N 21/482* (2011.01)
*H04R 27/00* (2006.01)

(52) U.S. Cl.
CPC ......... *H04N 21/4825* (2013.01); *H04R 27/00* (2013.01); *H04R 2227/005* (2013.01)

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,090,317 | B2 | 1/2012 | Burge et al. |
| 8,103,009 | B2 | 1/2012 | McCarty et al. |
| 8,214,447 | B2 | 7/2012 | Deslippe et al. |
| 8,234,395 | B2 | 7/2012 | Millington et al. |
| 8,483,853 | B1 | 7/2013 | Lambourne |
| 9,244,516 | B2 | 1/2016 | Gossain et al. |
| 9,288,596 | B2 | 3/2016 | Gossain et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0068558 | A1 | 6/2002 | Janik |
| 2002/0078161 | A1 | 6/2002 | Cheng |
| 2002/0124097 | A1 | 9/2002 | Isely et al. |
| 2003/0157951 | A1 | 8/2003 | Hasty |
| 2004/0024478 | A1 | 2/2004 | Hans et al. |
| 2004/0133291 | A1* | 7/2004 | Nakayama ................ G06F 8/67 700/94 |
| 2006/0161621 | A1 | 7/2006 | Rosenberg |
| 2006/0218321 | A1* | 9/2006 | Hotta .................. G06F 13/4291 710/62 |
| 2006/0253782 | A1 | 11/2006 | Stark et al. |
| 2007/0022207 | A1 | 1/2007 | Millington et al. |
| 2007/0142944 | A1 | 6/2007 | Goldberg et al. |
| 2008/0170511 | A1 | 7/2008 | Shorty et al. |
| 2008/0281451 | A1* | 11/2008 | Aoki ...................... H04H 60/04 700/94 |
| 2009/0094317 | A1 | 4/2009 | Venkitaraman |
| 2013/0094667 | A1 | 4/2013 | Millington et al. |
| 2014/0003295 | A1 | 1/2014 | Gossain et al. |
| 2014/0093219 | A1 | 4/2014 | Trivedi |
| 2014/0181202 | A1 | 6/2014 | Gossain |
| 2015/0100991 | A1 | 4/2015 | Risberg et al. |

OTHER PUBLICATIONS

United States Patent and Trademark Office, U.S. Appl. No. 60/825,407, filed Sep. 12, 2003, entitled "Controlling and manipulating groupings in a multi-zone music or media system," 82 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
"AudioTron Quick Start Guide, Version 1.0", Voyetra Turtle Beach, Inc., Mar. 2001, 24 pages.
"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
International Searching Authority, International Search Report and Written Opinion dated Oct. 12, 2015, issued in connection with International Application No. PCT/US2015/036456, filed on Jun. 18, 2015, 14 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo" Analog Stereo Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Sep. 16, 2015, issued in connection with U.S. Appl. No. 14/308,571, filed Jun. 18, 2014, 12 pages.
Notice of Allowance dated Mar. 14, 2016, issued in connection with U.S. Appl. No. 14/308,571, filed Jun. 18, 2014, 5 pages.
Palm, Inc., "Handbook for the Palm VII Handheld," May 2000, 311 pages.
Presentations at WinHEC 2000, May 2000, 138 pages.
UPnP; "Universal Plug and Play Device Architecture," 08 Jun. 2000; version 1.0; Microsoft Corporation; pp. 1-54.

* cited by examiner

| Playback Device ID | Group ID | Group Coordinator | Display Name |
|---|---|---|---|
| Device1 | Group1 | Y | Living Room |
| Device2 | Group2 | Y | Dining Room |
| Device3 | Group3 | Y | Balcony |
| Device4 | Group4 | Y | Master Bedroom |

FIGURE 6A

| Playback Device ID | Group ID | Group Coordinator | Display Name |
|---|---|---|---|
| Device1 | Group1 | Y | Living Room + 2 |
| Device2 | Group1 | N | -- |
| Device3 | Group1 | N | -- |
| Device4 | Group4 | Y | Master Bedroom |

FIGURE 6B

| Playback Device ID | Group ID | Group Coordinator | Display Name |
|---|---|---|---|
| Device1 | Group1 | Y | Living Room + Dining Room |
| Device2 | Group1 | N | -- |
| Device3 | Group5 | Y | Balcony |
| Device4 | Group4 | Y | Master Bedroom |

FIGURE 6C

| Playback Device ID | Group ID | Group Coordinator | Display Name |
|---|---|---|---|
| Device1 | Group5 | Y | Living Room |
| Device2 | Group1 | N | -- |
| Device3 | Group1 | Y | Dining Room + Balcony |
| Device4 | Group4 | Y | Master Bedroom |

FIGURE 6D

DEVICE GROUP IDENTIFICATION

This application claims priority under 35 U.S.C. § 120 to, and is a continuation of, U.S. non-provisional patent application Ser. No. 14/308,571, filed on Jun. 18, 2014, entitled "Device Group Identification," which is incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from a plethora of sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIGS. 6A, 6B, 6C, and 6D show a series of illustrative group information tables for example zone groups in a media playback system.

Figure 1:
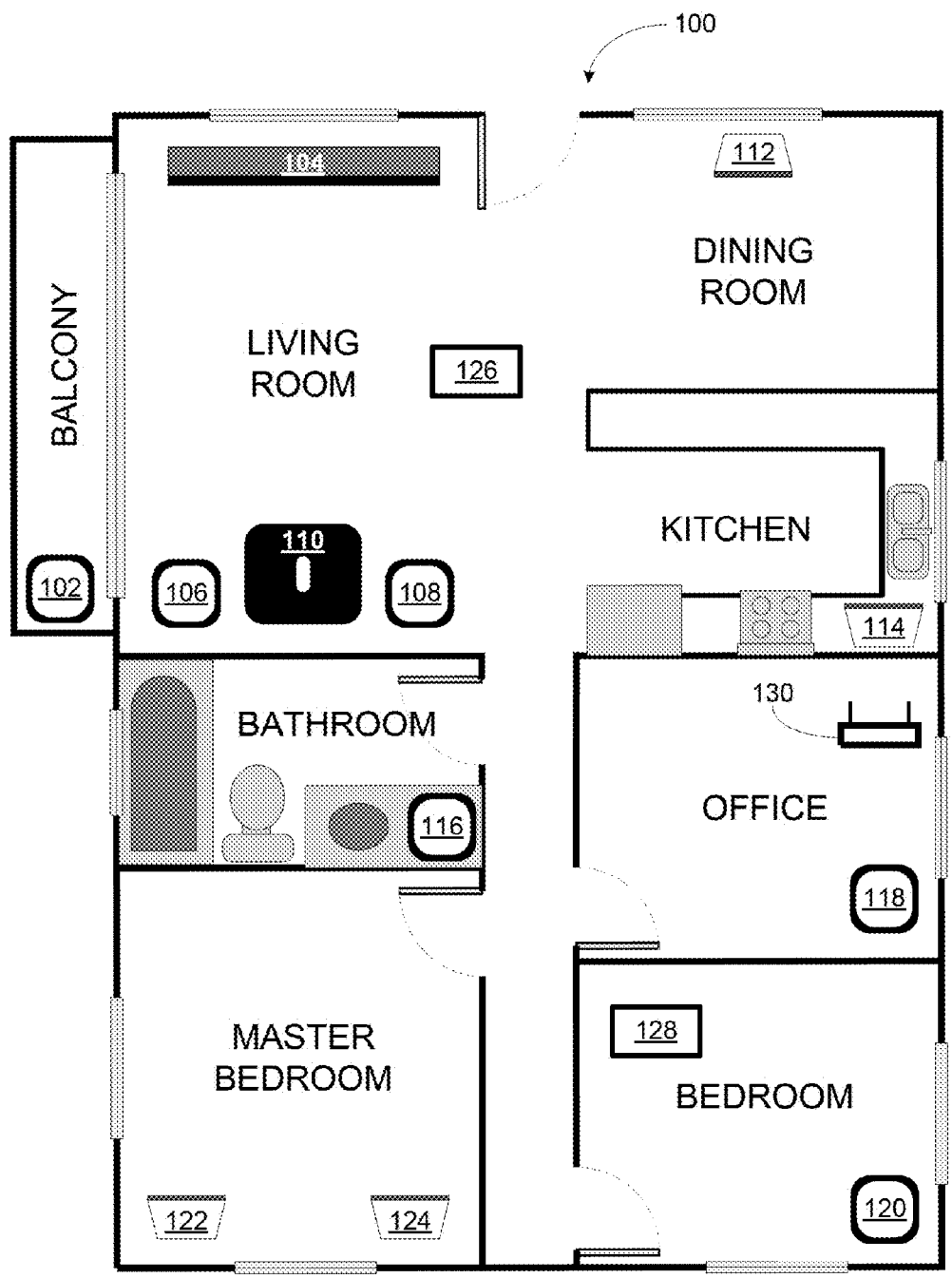
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Examples discussed herein relate to identification of device groups in a network. In one example, one or more devices in a network may be grouped together to perform certain functions as a group. For instance, one or more playback devices in a media playback system may form a zone group to play media content in synchrony. Each group in the network may have a group identification, a group name, and a group coordinator. Devices having the same group identification may be part of the same group. A group coordinator of the group may coordinate the devices in the group to perform the certain functions as a group. In the case of the media playback system, the group coordinator may coordinate synchronous playback of media content by each device in the zone group.

A computing device may be in communication with the devices in the network to receive group information for the devices in the network. For instance, the computing device may be a controller device of the media playback system, and may display on a user interface the group configurations of the playback devices in the media playback system.

In some examples, the computing device may receive from each device on the network that is capable of being a group coordinator, a transmission indicating a group identification associated with a group the respective device is a part of. In one example, the transmission indicating the group identification of the respective device may be a part of a transmission indicating the presence of the respective device on the network. The computing device may then, based on the received group identification, maintain a table of devices in the network, and a group identification corresponding to each device entry in the table. The table may be stored as data on storage data associated with the computing device.

In one case, the transmission received from a device in the network may further indicate whether the device is a group coordinator of the group associated with the group identification indicated in the transmission. In the case the device is a group coordinator, the transmission may further indicate a display name that can be displayed to represent the group on a user interface. In the case of the media playback system, the user interface may be a controller interface for controlling the media playback system. The indication that the device is the group coordinator and the display name may also be stored in the table.

In one example, a particular device on the network may send to the computing device, the transmission indicating a group identification associated with the particular device in response to a request from the computing device for the group identification associated with the particular device. In another example, the particular device may send the transmission when the group identification associated with the device has changed. For instance, if the particular device has changed from being in a first group to a second group, the particular device may responsively send to the computing device, a transmission indicating a group identification that is associated with the second group. In some cases, the particular device may also send to the computing device a transmission indicating that the particular device is no longer part of the first group. In another instance, if the particular device has changed from being a group coordinator to not being a group coordinator, or vice versa, the particular device may responsively send to the computing device, a transmission indicating such a change. Other examples are also possible.

As indicated above, the present discussions involve identification of device groups in a network. In one aspect, a method is provided. The method involves receiving, by a controller device from a playback device of a media playback system, a transmission indicating a group identification associated with a zone group. The playback device is capable of being a group coordinator for coordinating synchronous playback of media content by one or more playback devices. The method also involves storing, by the controller device, in data storage, data indicating that the playback device is in the zone group.

In another aspect, a controller device is provided. The controller device includes a processor and memory having stored thereon instructions executable by the processor to cause the controller device to perform functions. The functions include receiving from a playback device of a media playback system, a transmission indicating a group identification associated with a zone group. The playback device is capable of being a group coordinator for coordinating synchronous playback of media content by one or more playback devices. The functions also include storing in data storage, data indicating that the playback device is in the zone group.

In another aspect, a non-transitory computer readable memory is provided. The non-transitory computer readable memory has stored thereon instructions executable by a controller device to cause the computing device to perform functions. The functions include receiving from a playback device of a media playback system, a transmission indicating a group identification associated with a zone group. The playback device is capable of being a group coordinator for coordinating synchronous playback of media content by one or more playback devices. The functions also include storing in data storage, data indicating that the playback device is in the zone group.

In another aspect, a method is provided. The method involves receiving, by a playback device from a controller device, a request for group identification information from playback devices capable of being a group coordinator for coordinating synchronous playback of media content by one or more playback devices, and determining, by the playback device, a group identification associated with a zone group in a media playback system. The playback device is one of at least one playback device in the zone group. The method also involves sending, by the playback device to the controller device, a transmission indicating the group identification.

In another aspect, a playback device is provided. The playback device includes a processor and memory having stored thereon instructions executable by the processor to cause the playback device to perform functions. The functions include receiving from a controller device, a request for group identification information from playback devices capable of being a group coordinator for coordinating synchronous playback of media content by one or more playback devices, and determining a group identification associated with a zone group in a media playback system. The playback device is one of at least one playback device in the zone group. The functions also include sending to the controller device, a transmission indicating the group identification.

In another aspect, a non-transitory computer readable memory is provided. The non-transitory computer readable memory has stored thereon instructions executable by a playback device to cause the computing device to perform functions. The functions include receiving from a controller device, a request for group identification information from playback devices capable of being a group coordinator for coordinating synchronous playback of media content by one or more playback devices, and determining a group identification associated with a zone group in a media playback system. The playback device is one of at least one playback device in the zone group. The functions also include sending to the controller device, a transmission indicating the group identification.

In another aspect, a method is provided. The method involves receiving, by a controller device from a playback device of a media playback system, a transmission indicating (a) a group identification associated with a zone group and (b) one of (i) that the playback device is a group coordinator for coordinating synchronous playback of media content by one or more playback devices or (ii) that the playback device is not the group coordinator. The method also involves storing, by the controller device, in data storage, data indicating that the playback device is in the zone group.

In another aspect, a controller device is provided. The controller device includes a processor and memory having stored thereon instructions executable by the processor to cause the controller device to perform functions. The functions include receiving from a playback device of a media playback system, a transmission indicating (a) a group identification associated with a zone group and (b) one of (i) that the playback device is a group coordinator for coordinating synchronous playback of media content by one or more playback devices or (ii) that the playback device is not the group coordinator. The functions also include storing in data storage, data indicating that the playback device is in the zone group.

In another aspect, a non-transitory computer readable memory is provided. The non-transitory computer readable memory has stored thereon instructions executable by a controller device to cause the computing device to perform functions. The functions include receiving from a playback device of a media playback system, a transmission indicating (a) a group identification associated with a zone group and (b) one of (i) that the playback device is a group coordinator for coordinating synchronous playback of media content by one or more playback devices or (ii) that the playback device is not the group coordinator. The functions also include storing in data storage, data indicating that the playback device is in the zone group.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
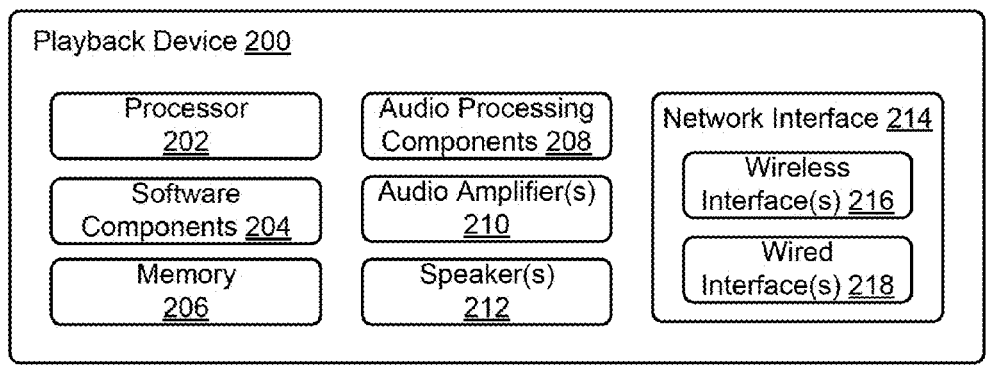
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones. As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
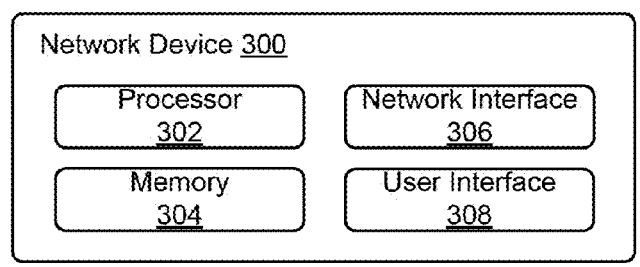
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
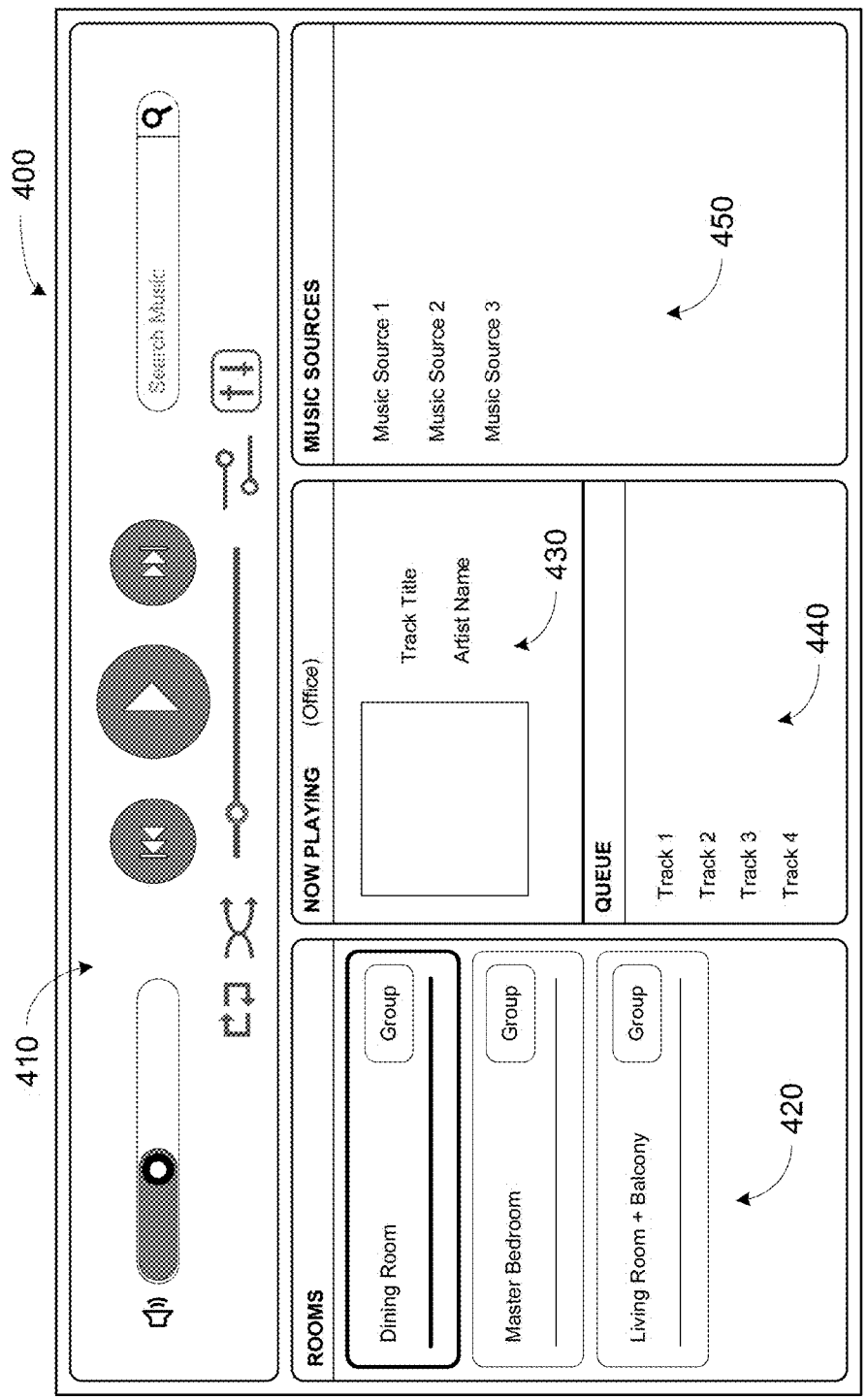
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Methods for Device Group Identification

Figure 5A:
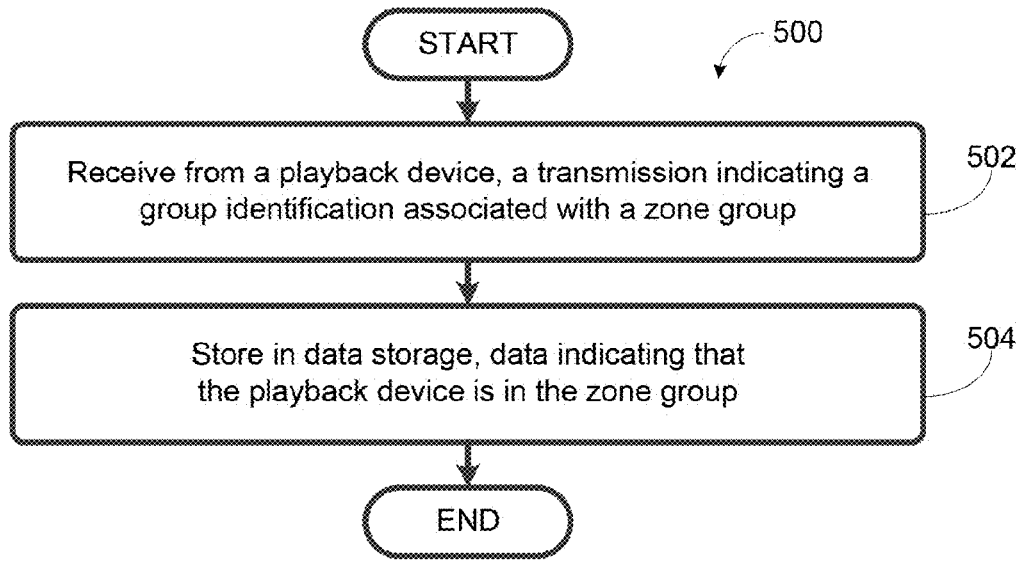
FIG. 5A shows an example flow diagram of a method for maintaining group information associated with a playback device in a media playback system.

As mentioned above, examples described herein relate to identification of device groups in a network. As indicated previously, one example of device groups in a network is zone groups of playback devices in a media playback system. FIG. 5A shows an example flow diagram of a method 500 for maintaining group information associated with a playback device in the media playback system, and FIG. 5B shows an example flow diagram of a method 550 for providing group information associated with the playback device in the media playback system.

Figure 5B:
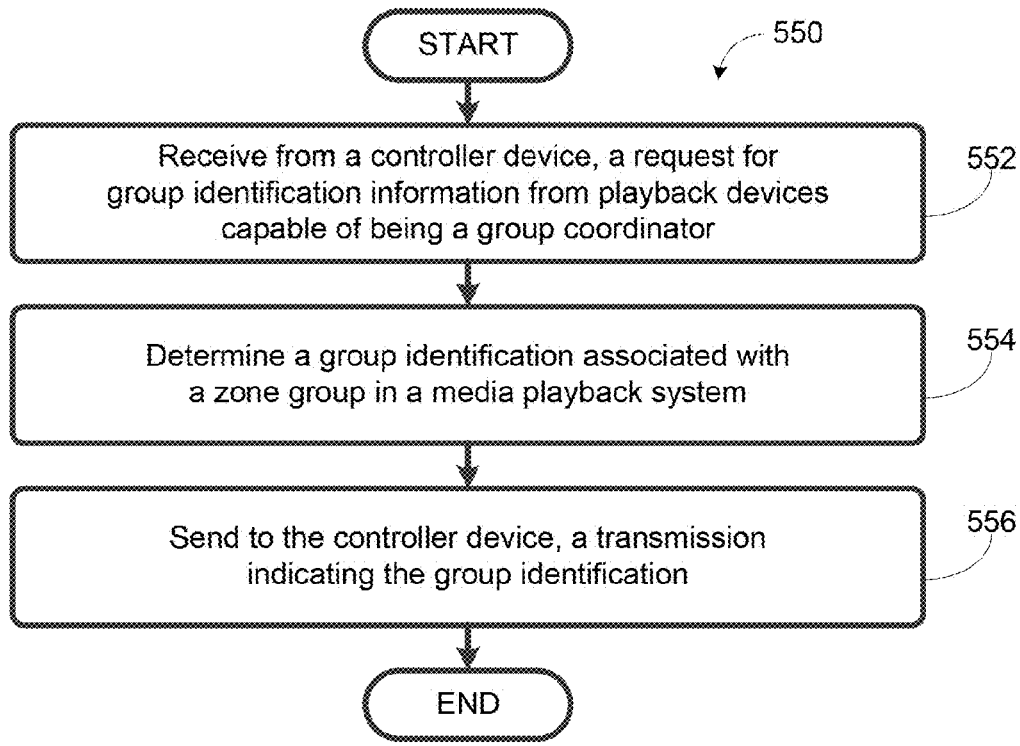
FIG. 5B shows an example flow diagram of a method for providing group information associated with a playback device in a media playback system.

Both methods 500 and 550 shown in FIGS. 5A and 5B, respectively, present embodiments that can be implemented within an operating environment involving, for example, the media playback system 100 of FIG. 1, one or more of the playback device 200 of FIG. 2, and one or more of the control device 300 of FIG. 3. For instance, method 500 may be performed by a controller device such as the control device 300 of FIG. 3, and method 550 may be performed by a playback device such as the playback device 200 of FIG. 2.

Method 500 may include one or more operations, functions, or actions as illustrated by one or more of blocks 502-504, and method 550 may include one or more operations, functions, or actions as illustrated by one or more of block 552-556. Although the series of blocks 502-504 and 552-556 are illustrated in their respective sequential orders, the respective series of blocks may also be performed in parallel, and/or in a different order than those described herein. Also, the various blocks may be combined into fewer blocks, divided into additional blocks, and/or removed based upon the desired implementation.

In addition, for the method 500, 550 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500, 550, and other processes and methods disclosed herein, each block in FIGS. 5A and 5B may represent circuitry that is wired to perform the specific logical functions in the process.

a. Discovering and Maintaining Playback Device Group Information

As shown in FIG. 5A, block 502 of method 500 involves receiving from a playback device, a transmission indicating a group identification associated with a zone group. As indicated above in sections II.a.-II.d., a zone group may include one or more playback devices that are configured to play media content in synchrony. In one example, each zone group in the media playback system may be associated with a respective group identification, and each device in a zone group may be associated with the same group identification. For instance, if playback devices "Device1" and "Device2" are both part of a zone group associated with a group identification of "Group1", both Device1 and Device2 may be associated with the group identification Group1. In one example, the group identification indicated in the transmission received from the playback device may be a group identification associated with the playback device. Accordingly, the playback device may be a part of the zone group that is associated with the group identification.

In one example, each zone group has a group coordinator that coordinates synchronous playback of media content by one or more playback devices in the zone group. In one case, the playback device from which the transmission was received is a playback device that is capable of being a group coordinator. For instance, the playback device is capable of coordinating synchronous playback of media content by one or more playback devices. Coordinating synchronous playback of media content by one or more playback devices may involve, among other functions, establishing and maintaining communication with each of the one or more playback devices, and managing a clock synchronization mechanism among the one or more playback devices. Coordinating synchronous playback of media content may further involve one or more of receiving, processing, and distributing the media content to the one or more playback devices. In one example, a playback device that is capable of being a group coordinator is a playback device that is configured to, when instructed, to coordinate synchronous playback of media content by one or more playback devices in a zone group.

In one example, the transmission indicating the group identification may further indicate whether the playback device is the group coordinator for the zone group. In one case, if the playback device is indeed the group coordinator for the zone group, the transmission received from the playback device may also indicate a display name for the zone group. The display name may be a name used to represent the zone group on a controller interface such as that shown in the playback zone region 420 of the controller interface 400 shown in FIG. 4. In one example, the display name may be determined by the group coordinator.

In one example, the controller device may, prior to receiving the transmission from the playback device, send a request for group identification information from playback devices in the media playback system that are capable of being a group coordinator. For instance, the controller device may broadcast the request to any device in the media playback system (or to an extent, any device on a local network). The request may indicate that only playback devices capable of being a group coordinator should respond. As such, a device that is not capable of being a group coordinator may receive the request and ignore the request, while a device that is capable of being a group coordinator may receive the request and responsively send a transmission indicating a group identification of the device. Other examples ere also possible.

In one case, the transmission from the playback device may be sent by the playback device and received by the controller device periodically, absent any request for group identification information from the controller device. In another case, the transmission from the playback device may be sent by the playback device and received by the controller device when a change to group identification information associated with the playback device occurs. The change to group identification information associated with the playback device may include a change in the group identification associated with the playback device, and/or a change in whether the playback device is a group coordinator of the playback zone. Other examples are also possible.

At block 504, the method 500 involves storing in data storage, data indicating that the playback device is in the zone group. In one example, the data storage may be a local data storage of the controller device. In another example, the data storage may be a remote data storage, such as data storage associated with a cloud network. In this case, the controller device may transmit the data to the remote data storage for storage.

In one example, the data may include a table (or database) with an entry corresponding to each playback device in the media playback system that is capable of being a group coordinator. In one case, if the table does not have an entry for the playback device from which the transmission was received, an entry for the playback device may be created in the table, and information indicated in the transmission received from the playback device may be stored in the table in association with the entry for the playback device.

In another case, the table may already include an entry for the playback device. In one instance, if information indicated in the transmission received from the playback device (i.e. group identification, whether the playback device is the group coordinator, and if applicable, the display name of the associated zone group) matches information corresponding to the playback device entry in the table, the controller device may not take any further action to modify to the table and/or store the table as data in the data storage.

In another instance, if the information indicated in the transmission received from the playback device does not match information corresponding to the playback device entry in the table, the controller device may update the table with the information indicated in the transmission, before storing the table as data in the data storage.

In this instance, the controller device may also update the controller interface to display representations of the updated information. For example, if a display name for the zone group changed, the controller interface may be updated to display a representation of the new display name. The display name for the zone group may change as a result of a change in playback devices and/or group coordinator in the zone group, or an input to change the display name of the zone group, among other possibilities. The input to change the display name may be received from a user accessing the media playback system via the controller interface.

As such, in one example, method 500 may allow the controller device to be notified of any changes to group configurations of devices and display names of groups in the media playback system, and update the controller interface to display representations of the updated information with minimal delay. As indicated above, the controller device may receive the transmission discussed in connection to block 502, in response to a request for group identification information sent by the controller device. Additionally, or alternatively, the controller device may receive the transmission from a respective playback device periodically and/or when a change to the group identification information associated with the respective playback device has occurred. Other examples are also possible.

FIGS. 6A-6B shows a series of illustrative group information tables for example zone groups in a media playback system that includes four playback devices, "Device1," "Device2," "Device3," and "Device4." In one example, each of the four playback devices is capable of being a group coordinator.

As shown in the table of FIG. 6A, Device1 may have sent to a controller device associated with the media playback system, a transmission indicating (i) a group identification "Group1," (ii) that Device1 is the group coordinator for the zone group associated with the group identification Group1, and (iii) a display name of "Living Room" for the zone group associated with the group identification Group1.

Likewise, Device2 may have sent to the controller device, a transmission indicating (i) a group identification "Group2," (ii) that Device2 is the group coordinator for the zone group associated with the group identification Group2, and (iii) a display name of "Dining Room" for the zone group associated with the group identification Group2. Device3 may have sent to the controller device, a transmission indicating (i) a group identification "Group3," (ii) that Device3 is the group coordinator for the zone group associated with the group identification Group3, and (iii) a display name of "Balcony" for the zone group associated with the group identification Group3. Device4 may have sent to the controller device, a transmission indicating (i) a group identification "Group4," (ii) that Device4 is the group coordinator for the zone group associated with the group identification Group4, and (iii) a display name of "Master Bedroom" for the zone group associated with the group identification Group4.

While the playback device is in the group configuration represented in the table of FIG. 6A, Device2 and Device3 may have been added to the zone group associated with the group identification Group1, and for which Device1 is a group coordinator. In one case, Device2 and Device3 may each send to the controller device, a transmission indicating (i) the group identification Group1 and (ii) that the respective device is not the group coordinator. In one case, the respective transmissions sent by Device2 and Device3 may indicate a blank entry for the display name, because neither are the group coordinator. In other words, in some cases, only the group coordinator of a group sends transmissions indicating the display name of the group. In one example, Device2 and Device3 may further send to the controller device, respective transmissions indicating that Device2 and Device3 are no longer part of the zone groups associated with group identifications Group2 and Group3, respectively.

Due to the additions of Device2 and Device3, the display name for the zone group associated with group identification Group1 may also be updated. In one case, Device1 may send to the controller, a transmission indicating (i) the group identification Group1, (ii) that Device1 is the group coordinator, and (iii) that the display name for the zone group associated with the group identification Group1 is now "Living Room+2." In one example, the display name may be generated by Device1 based on characteristics of the zone group and the devices in the zone group. In another example, the display name may be provided when the group configuration is modified. For instance, a user modifying the group configuration of the media playback system may also provide a display name for the modified group configuration of the media playback system.

As shown in the table of 6B, the table in FIG. 6A has been updated in response to the transmissions from Device2, Device3, and Device1. The entry in the table for Device2 now has a group identification of Group1, an indication that the Device2 is not the group coordinator, and no information for the display name. Similarly, the entry in the table for Device3 also now has a group identification of Group1, an indication that the Device3 is not the group coordinator, and no information for the display name. The entry for Device1 continues to have a group identification of Group1, and an indication that the Device1 is the group coordinator, but a new display name of "Living Room+2."

While the playback device is in the group configuration represented in the table of FIG. 6B, Device3 may have been removed from the zone group associated with the group identification Group1, and for which Device1 is the group coordinator. Device3 may have been removed from the zone group associated with the group identification Group1 because Device3 was added to a new group. Device3 may then send to the controller device, a transmission indicating (i) a group identification "Group5," (ii) that Device3 is the group coordinator, and (iii) that a display name for the zone group associated with the group identification Group5 is now "Balcony".

While Device3 may have effectively returned to a group having the same display name and configuration as the zone group that was associated with the group identification Group3 shown in the table of FIG. 6A, group identification Group3 may no longer exist after Device3 left the zone group. As such, the new group identification of Group5 may be used as the group identification for the new zone group having the display name "Balcony."

Other examples of group identification generation and potential preservation of group identifications over the course of group configuration changes are also possible. In one example, Device3 may also send to the controller device, a transmission indicating that Device3 is no longer part of the zone group associated with the group identification Group1.

Due to the removal of Device3, the display name for the zone group associated with group identification Group1 may also be updated. In one case, Device1 may send to the controller, a transmission indicating (i) the group identification Group1, (ii) that Device1 is the group coordinator, and (iii) that the display name for the zone group associated with the group identification Group1 is now "Living Room+ Dining Room."

As shown in the table of 6C, the table in FIG. 6B has been updated in response to the transmissions from Device3 and Device1. The entry in the table for Device3 now has a group identification of Group5, an indication that the Device3 is the group coordinator, and a display name of "Balcony." The entry for Device1 continues to have a group identification of Group1, and an indication that the Device1 is the group coordinator, but a new display name of "Living Room+ Dining Room."

In another example, while the playback device is in the group configuration represented in the table of FIG. 6B, Device1 may have been removed from the zone group associated with the group identification Group1, and for which Device1 is actually the group coordinator. Device1 may have been removed from the group associated with the group identification Group1 because Device1 was added to a new group. Device1 may then send to the controller device, a transmission indicating (i) a group identification Group5, (ii) that Device1 is the group coordinator, and (iii) a display name of "Living Room" for the zone group associated with the group identification Group5.

While Device1 may have effectively returned to a group having the same display name and configuration as the zone group that was associated with group identification Group1 shown in the table of FIG. 6A, Group1 remains as the group identification associated with the zone group including Device2 and Device3. As such, a new group identification Group5 may be used as the group identification for the new "Living Room" group.

Because Device1 was the group coordinator for the group associated with the group identification Group1, a new group coordinator may be determined for the zone group associated with the group identification Group1. In one example, Device1 may be configured to select a device to become the group coordinator, and send a message to the selected device to indicate that the selected device is to become the group coordinator. In another example, a device may be selected as the group coordinator based on a computing power of the device. In either example, the device may or may not already be a device in the zone group. In a further example, a device in the group may be selected as the group coordinator based on a duration of time the device has been in the group. In this example, Device3 was selected as the new group coordinator for the zone group associated with group identification Group1. Device3 may have been selected because Device3 is already in the zone group, and may have more computing power and/or has been in the zone group longer than Device2, among other possibilities.

Due to the removal of Device1, the display name for the zone group associated with the group identification Group1 may also be updated. In one case, Device3, now the group coordinator, may send to the controller, a transmission indicating (i) the group identification Group1, (ii) that Device3 is the group coordinator, and (iii) that the display name for the zone group associated with the group identification Group1 is now "Dining Room+Balcony." The new display name of the one group associated with the group identification Group1 may have been determined by the new group coordinator Device3.

As shown in the table of 6D, the table in FIG. 6B has been updated in response to the transmissions from Device1 and Device3. The entry in the table for Device1 now has a group identification of Group5, an indication that the Device1 is the group coordinator, and a display name of "Living Room." The entry for Device3 continues to have a group identification of Group1, but now has an indication that the Device3 is the group coordinator, and a new display name of "Dining Room+Balcony."

In one example, the transmissions in the examples above may have been sent by the playback devices Device1, Device2, Device3, and/or Device4 in response to a request for group identification information sent by the controller device. In another example, the transmissions may have been sent in response to the changes in group identification information associated with the playback devices. In a further example, some of the transmissions may have been sent in response to a request for group identification information sent by the controller device, while some other transmissions may have been sent in response to the changes in group identification information associated with the playback devices. Other examples are also possible.

One having ordinary skill in the art will appreciate that the sequence of group configuration changes described above in connection to FIGS. 6A-6D are only a few illustrative examples of the concepts discussed herein. Other examples are also possible.

b. Providing Playback Device Group Information

As shown in FIG. 5B, block 552 of method 550 involves a playback device receiving from a controller device, a request for group identification information from playback devices capable of being a group coordinator. In one example, the request for group identification information received by the playback device may be similar to the request for group identification sent by the controller device discussed above in section III.a. As such, discussions above relating to the request for group identification information may also be applicable to block 552.

Block 554 of method 550 involves determining a group identification associated with a zone group in a media playback system. In one example, when the playback device joins an existing zone group, the playback device may receive from the controller device, and/or one or more of the other devices in the zone group, a message indicating the group identification associated with the zone group. In another example, if the playback device joins a new zone group as the group coordinator, the playback device may determine the group identification based on some group identification generating protocol. In the examples discussed above in connection to FIGS. 6C and 6D, group identifications may include a numerical portion, and new group identifications may be based on incrementing the numerical portion of the group identification.

In another example, the group identification may be received from another device associated with the media playback system, such as a local or remote server, a playback device, or a controller device configured to generate group identifications. The device configured to generate group identifications may generate group identifications according to the incrementing numeral protocol and/or any other viable method. In the case the group identification is received from another device, the group coordinator may, upon becoming the group coordinator of the new zone group, send to the other device, a request for a new group identification, and the other device may responsively provide the new group identification. Other examples are also possible.

At block 556, the method 550 involves sending to the controller device, a transmission indicating the group identification. In one example, the transmission indicating the group identification that is sent from the playback device to the controller device may be similar to the transmission received by the controller device at block 502 of the method 500. As such, discussions above relating to the receiving of the transmission by the controller device may also be applicable to block 556. For instance, the transmission may further indicate that the playback device is the group coordinator of the zone group, and/or a display name of the zone group.

While the method 550 as shown in FIG. 5B involves receiving a request for group identification information at block 552, one having ordinary skill in the art will appreciate that, similar to the discussions in section III.a., the determination of the group identification at block 554 and the sending of the transmission at block 556 may be performed whether or not a request for group identification information is received. For instance, as discussed above, the group identification may be determined and the transmission may be sent by the playback device if and when any change to a zone group configuration of the playback device has occurred. Other examples are also possible.

In one example, communication between controller devices and playback devices described above may be facilitated by a Universal Plug and Playback (UPnP) protocol. In one case, the transmission received by the controller device at block 502 of FIG. 5A and sent by the playback device at block 556 of FIG. 5B may include a NOTIFY method of the UPnP protocol. Other interactions, such as if and when a playback device sends the controller device a transmission indicating that the playback device is no longer part of a zone group, may also be facilitated by the NOTIFY method. In one instance, the request for group identification information, sent by the controller device and received by the playback device at block 552 of FIG. 5B, may include an M-SEARCH method of the UPnP protocol. Other examples, including those relating to protocols other than the UPnP protocol, are also possible.

One having ordinary skill in the art will appreciate that while the above examples generally refer to a media playback system having one or more playback devices in one or more zone groups, the concepts discussed herein may be relevant to other applications as well. For instance, similar device group identification and device group maintenance methods may be implemented for home security systems and/or home appliance control systems. Other examples are also possible.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

I claim:

1. A first playback device of a media playback system, the first playback device comprising:
    a network interface;
    one or more processors; and
    computer-readable memory having stored thereon instructions, wherein the instructions, when executed by the one or more processors, cause the first playback device to perform a method comprising:
    receiving, over the network interface from a second playback device of the media playback system, first data indicating a first group identification corresponding to a first zone group of playback devices configured to play back audio content in synchrony, wherein the first zone group comprises the first playback device and the second playback device, and wherein the second playback device is a group coordinator of the first zone group, the group coordinator of a zone group configured to provide playback timing information to other playback devices in the zone group during synchronous playback;
    after receiving the first data, receiving a message indicating that the second playback device is leaving the zone group;
    in response to receiving the message, forming a second zone group, wherein the second zone group comprises the first playback device as group coordinator of the second zone group, and wherein forming the second zone group comprises:
        determining a second group identification corresponding to the second zone group;

determining a display name that represents the second zone group, the display name distinct from the second group identification; and in response to forming the second zone group, causing, via the network interface, at least one controller device to update a control interface for the media playback system to display an indication of the second zone group, the indication of the second zone group comprising the determined display name, wherein causing at least one controller device to update the control interface for the media playback system comprises transmitting, over the network interface to the at least one controller device configured to control at least the first playback device and the second playback device, second data indicating the second group identification and the determined display name that represents the second zone group.

2. The first playback device of claim 1, wherein the method further comprises:

before determining the second group identification, receiving, over the network interface, a message indicating that the first playback device is to become the group coordinator of the zone group.

3. The first playback device of claim 1, wherein the method further comprises:

before transmitting the second data, storing in data storage of the first playback device, the second group identification.

4. The first playback device of claim 1, wherein the method further comprises:

before receiving the message indicating that the second playback device is leaving the zone group, storing in data storage of the first playback device, the first group identification; and transmitting, over the network interface to the at least one controller device, third data indicating the first group identification.

5. The first playback device of claim 1, wherein the method further comprises:

before transmitting the second data to the at least one controller device and after determining the second group identification, receiving, over the network interface from the at least one controller device, a request for group identification information from playback devices in the media playback system that includes the first playback device and the second playback device.

6. The first playback device of claim 1, wherein the method further comprises:

wherein the second zone group comprises a first zone that includes the first playback device, a second zone that includes the second playback device, and a third zone that includes a third playback device and wherein determining the display name that represents the second zone group comprises determining a particular display name that representing an area of a household that includes the first zone and the second zone.

7. The first playback device of claim 1, wherein the second zone group comprises a first zone that includes the first playback device, the first zone having a first zone name, and wherein determining the display name that represents the second zone group comprises determining a particular display name that includes the first zone name of the first zone.

8. The first playback device of claim 1, wherein the zone group further comprises a third playback device, and wherein the method further comprises:

after determining the second group identification, transmitting, over the network interface to the third playback device, third data indicating the second group identification.

9. The first playback device of claim 1, wherein the message is a first message, and wherein the method further comprises:

after determining the second group identification, receiving, over the network interface, a second message indicating that the second playback device is joining the second zone group; and after receiving the second message, transmitting, over the network interface to the second playback device, the second group identification.

10. The first playback device of claim 1, wherein the message is a first message, and wherein the method further comprises:

after determining the second group identification, receiving, over the network interface, a second message indicating that the second playback device is joining the second zone group;

in response to receiving the second message, forming a third zone group, wherein the third zone group comprises the first playback device and the second playback device, and wherein forming the third zone group comprises determining a third group identification; and in response to forming the third zone group, transmitting, over the network interface, third data indicating the third group identification to the second playback device.

11. The first playback device of claim 10, wherein the method further comprises:

after determining the third group identification, transmitting, to the at least one controller device, fourth data indicating (i) the third group identification and (ii) that the first playback device is the group coordinator of the second zone group.

12. The first playback device of claim 1, wherein the method further comprises:

after receiving the message indicating that the second playback device is leaving the first zone group, transmitting, over the network interface to the at least one controller device, third data indicating that the first playback device is the group coordinator of the second zone group.

13. Tangible, non-transitory, computer-readable memory having stored thereon instructions, wherein the instructions, when executed by one or more processors, cause a first playback device of a media playback system to perform a method comprising:

receiving, over a network interface from a second playback device of the media playback system, first data indicating a first group identification corresponding to a first zone group of playback devices configured to play back audio content in synchrony, wherein the first zone group comprises the first playback device and the second playback device, and wherein the second playback device is a group coordinator of the first zone group, the group coordinator of a zone group configured to provide playback timing information to other playback devices in the zone group during synchronous playback;

after receiving the first data, receiving a message indicating that the second playback device is leaving the zone group;

in response to receiving the message, forming a second zone group, wherein the second zone group comprises the first playback device as group coordinator of the second zone group, and wherein forming the second zone group comprises:
    determining a second group identification corresponding to the second zone group;
    determining a display name that represents the second zone group, the display name distinct from the second group identification; and
in response to forming the second zone group, causing, via the network interface, at least one controller device to update a control interface for the media playback system to display an indication of the second zone group, the indication of the second zone group comprising the determined display name, wherein causing at least one controller device to update the control interface for the media playback system comprises transmitting, over the network interface to the at least one controller device configured to control at least the first playback device and the second playback device, second data indicating the second group identification and the determined display name that represents the second zone group.

14. The tangible, non-transitory, computer-readable memory of claim 13,
    wherein the second zone group comprises a first zone that includes the first playback device, a second zone that includes the second playback device, and a third zone that includes a third playback device and wherein determining the display name that represents the second zone group comprises determining a particular display name that representing an area of a household that includes the first zone and the second zone.

15. The tangible, non-transitory, computer-readable memory of claim 13,
    wherein the second zone group comprises a first zone that includes the first playback device, the first zone having a first zone name, and wherein determining the display name that represents the second zone group comprises determining a particular display name that includes the first zone name of the first zone.

16. The tangible, non-transitory, computer-readable memory of claim 13, wherein the method further comprises:
    before receiving the message indicating that the second playback device is leaving the zone group, storing, in data storage of the first playback device, the first group identification; and
    transmitting, over the network interface to the at least one controller device, third data indicating the first group identification.

17. A method comprising:
    receiving, via a network interface of a first playback device of a media playback system from a second playback device of the media playback system, first data indicating a first group identification corresponding to a first zone group of playback devices configured to play back audio content in synchrony, wherein the first zone group comprises the first playback device and the second playback device, and wherein the second playback device is a group coordinator of the first zone group, the group coordinator of a zone group configured to provide playback timing information to other playback devices in the zone group during synchronous playback;
    after receiving the first data, receiving a message indicating that the second playback device is leaving the zone group;
    in response to receiving the message, forming a second zone group, wherein the second zone group comprises the first playback device as group coordinator of the second zone group, and wherein forming the second zone group comprises:
        determining a second group identification corresponding to the second zone group;
        determining a display name that represents the second zone group, the display name distinct from the second group identification; and
    in response to forming the second zone group, causing, via the network interface, at least one controller device to update a control interface for the media playback system to display an indication of the second zone group, the indication of the second zone group comprising the determined display name, wherein causing at least one controller device to update the control interface for the media playback system comprises transmitting, over the network interface to the at least one controller device configured to control at least the first playback device and the second playback device, second data indicating the second group identification and the determined display name that represents the second zone group.

18. The method of claim 17,
    wherein the second zone group comprises a first zone that includes the first playback device, a second zone that includes the second playback device, and a third zone that includes a third playback device and wherein determining the display name that represents the second zone group comprises determining a particular display name that representing an area of a household that includes the first zone and the second zone.

19. The method of claim 17,
    wherein the second zone group comprises a first zone that includes the first playback device, the first zone having a first zone name, and wherein determining the display name that represents the second zone group comprises determining a particular display name that includes the first zone name of the first zone.

20. The method of claim 17, wherein the message is a first message, and wherein the method further comprises:
    after determining the second group identification, receiving, over the network interface of the first playback device, a second message indicating that the second playback device is joining the second zone group;
    in response to receiving the second message, forming, via the first playback device, a third zone group, wherein the third zone group comprises the first playback device and the second playback device, and wherein forming the third zone group comprises determining, via the first playback device, a third group identification; and
    in response to forming the third zone group, transmitting, over the network interface of the first playback device, third data indicating the third group identification to the second playback device.

\* \* \* \* \*